Jan. 7, 1930.  W. D. BELL  1,742,183
AUTOMOBILE FUEL PUMP
Filed June 28, 1926
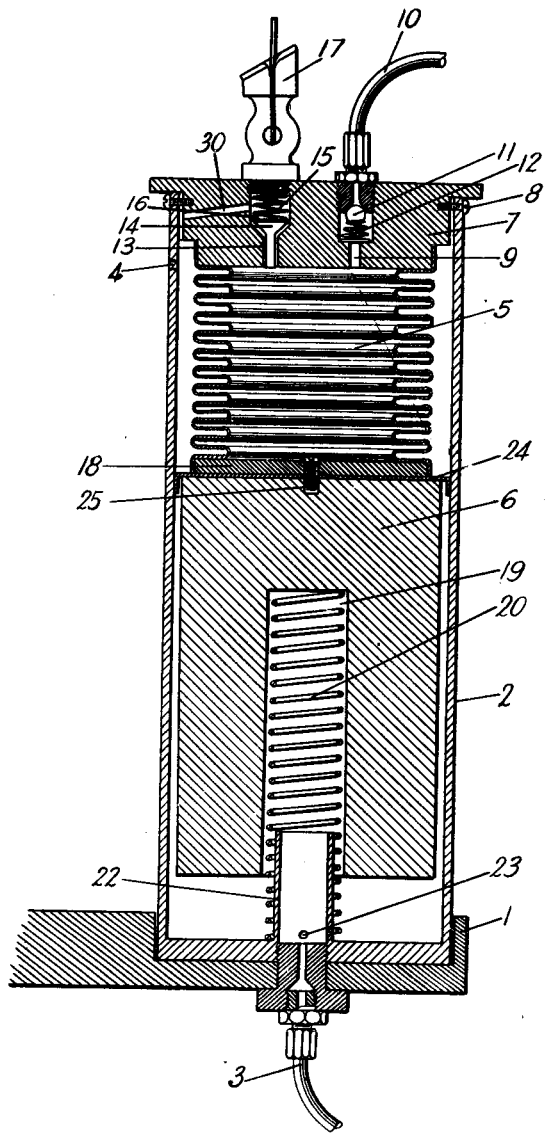
William D. Bell
INVENTOR.
BY Edwin P. Corbett
ATTORNEYS.

Patented Jan. 7, 1930

1,742,183

UNITED STATES PATENT OFFICE

WILLIAM D. BELL, OF COLUMBUS, OHIO, ASSIGNOR OF ONE-FOURTH TO EDWIN P. CORBETT, OF COLUMBUS, OHIO

AUTOMOBILE FUEL PUMP

Application filed June 28, 1926. Serial No. 119,123.

My invention relates to an automobile fuel pump. It has to do primarily with the provision of apparatus which is especially adapted to the raising of gasoline from the main tank of an automobile to the carburetor.

It operates as the result of the inertia of an element in conjunction with other structural features which are responsive to the vibrations of the engine or some other part of the motor vehicle. It is particularly desirable in that it comprises a self-contained structure, in that the pump casing also embodies a fuel chamber. It is further important in that the filling of this fuel chamber by the pumping action to a predetermined degree will automatically prevent further vibration of the parts in relation to the inertia element and will thereby automatically stop further pumping action.

Another important feature of my invention consists in the fact that I utilize a bellows which is of a structure, which, in itself, is long and, therefore quite flexible. Another important aspect of the device consists in the fact that I have eliminated all danger of my pump becoming inoperative due to the accumulation of air within the bellows because I have provided a diaphragm that will automatically clear itself of air. This is important, due to the fact that, if even a small air bubble is retained, it will by expanding and contracting with differences of pressure, absorb the small displacement of the liquid at each movement of the inertia element and the device will cease to function.

The preferred embodiment of my invention is shown in the accompanying drawings wherein similar characters of reference designate corresponding parts and wherein The figure is a sectional view of my device illustrating the internal structure thereof and showing the connections leading from the main tank and to the carburetor.

In the drawings, my device is shown mounted upon a supporting bracket 1. This supporting bracket is preferably mounted upon the engine where it will be subjected to the vibrations thereof or it may be mounted upon the automobile at some other location where it will receive the necessary vibrations. This bracket 1 carries an outer casing 2 provided with an outlet pipe 3 and a vent 4 to the atmosphere.

Mounted within the casing 2, I have provided a heavy mass 6 which is preferably of metal. This mass 6 is attached to a flexible tube or bellows 5. This bellows 5 is preferably connected at its upper end by soldering or otherwise to a cap 7 for the casing 2. This cap 7 is held in place by screws 8.

The cap 7 contains an inlet duct 9 which is in communication with an inlet pipe 10 under the control of a ball or other type of check valve 11 normally held in position to close the inlet pipe by means of a spring 12.

The cap 7 is also provided with an outlet duct 13 under the control of a one-way valve 14. This valve 14 normally governs the outflow of fuel from the interior of the diaphragm 5. It is maintained in seated position by means of a spring 15 located in a chamber 16 concentric with and immediately above the valve 14.

This chamber 16 is in communication at its lower end with the duct 13 and at its upper end it is in communication with a priming cup 17 and also through duct 30 with the interior of the casing 2, this interior of the casing 2 being open to the atmosphere by means of the vent 4. The heavy mass 6 is connected to a plate 18 which closes the lower end of the diaphragm 5 and any up and down movement of this heavy mass 6 serves to actuate the flexible tube as a bellows.

The heavy mass 6 is provided on its lower side with a central bore 19 and this central bore 19 contains a spring 20 which bears at its upper end against the inner end of the bore 19 and which is supported at its lower end upon the base of the casing 2.

The spring 20 in turn embraces at its lower end an upstanding guide tube 22 which is preferably formed integral with the base of the casing 2. This upstanding tube 22 is provided adjacent its base with an opening 23 which permits access of the fuel to the interior thereof. Leading out of the base of the tube 22 is the outlet pipe 3 which leads to the carburetor.

The heavy mass 6 is provided at its upper end with a packing cup 24. This packing cup is shown mounted on the mass by interposing it between the upper surface of this mass and the plate 18, the plate, the mass and the packing cup being secured together by a bolt 25.

In operation, the jolting of the supporting bracket 1 will result in a motion relative to the mass of heavy metal 6. This will cause the flexible tube 5 to act as a bellows with the result that fuel and air will be sucked in through the inlet pipe 10 and past the valve 11 into the interior of the flexible tube as the bellows is extended and discharged through 13, 14 and 30 as the bellows is compressed. This fuel will accumulate within the flexible tube and, under the influence of continued extension and collapse of the flexible tube, the fuel will be forced out past the valve 13 and through the opening 14 into the main chamber of the casing 2. This fuel will find its way down past the packing cup 20 and through the opening 23 in the upstanding tube 22 whence it will pass to the carbureter. If the fuel which passes below the packing cup 24 accumulates to the point where it reaches this packing cup, this structure will thereupon act as a dash-pot and prevent further pumping action until more fuel is needed. It will be understood that the priming cup 17 is only used to supply a quantity of fuel to the bowl of the carbureter when this bowl is completely empty, or for priming the system.

It will be seen that I have provided a device of this type which has numerous important advantages. Among these advantages is that which arises from the use of a bellows. Owing to its length and flexibility, this bellows will produce a much more extensive and effective pumping action than a disk diaphragm.

It is likewise important to notice that I have provided a local pool chamber which receives the fuel directly from the bellows pump and which, being open to the atmosphere, permits this pump to relieve itself of any air bubbles that would otherwise serve to interfere with the effectual operation of the device.

Another important feature of my device resides in the fact that my local pool chamber and my vibratable element are all self-contained, one being within the other, while the local pool chamber is so related to the vibratable element as to location and structure that it will automatically discontinue operations upon the accumulation of a predetermined amount of fuel.

Having thus described my invention, what I claim is:

1. A means for elevating fuel from the main tank of a motor vehicle to the carbureter thereof comprising a tank, a bellows member, a member suspended from said bellows and movable in response to vibration of the tank to operate said bellows, a means on said member having such contact with the walls of said tank as to permit passage of the fuel downwardly past said means into a storage chamber formed thereby and as to prevent return of said fuel, and means for admitting the fuel into said bellows member and then discharging it from said bellows member into said supplementary tank in response to the vibration of said bellows.

2. A means for elevating fuel from the main tank of a motor vehicle to the carburetor thereof comprising a tank, a bellows member, a member suspended from said bellows and movable in response to vibration of the tank to operate said bellows, a means on said member having such contact with the walls of said tank as to permit passage of the fuel downwardly past said means into a storage chamber formed thereby and as to prevent return of said fuel, a substantial clearance being otherwise formed around said member below said means, and means for admitting fuel into said bellows member and then discharging it from said bellows member into said supplementary tank in response to the vibration of said bellows.

3. A means for elevating fuel from the main tank of a motor vehicle to the carbureter thereof comprising a storage receptacle, an element in said storage receptacle operable by vibration, a bellows within said storage receptacle operated by the vibration of said last named element, an inlet to said bellows, an outlet from said bellows to said receptacle, and means permitting flow of fuel past said vibratory element and preventing the return flow thereof.

In testimony whereof I hereby affix my signature.

WILLIAM D. BELL.